US012680149B2

(12) United States Patent
Imamura et al.

(10) Patent No.: US 12,680,149 B2
(45) Date of Patent: Jul. 14, 2026

(54) METHOD FOR PRODUCING GRAIN-ORIENTED ELECTRICAL STEEL SHEET

(71) Applicant: JFE STEEL CORPORATION, Tokyo (JP)

(72) Inventors: Takeshi Imamura, Tokyo (JP); Ayaka Yoshikawa, Tokyo (JP); Masanori Takenaka, Tokyo (JP); Hiroi Yamaguchi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 448 days.

(21) Appl. No.: 18/561,841

(22) PCT Filed: May 27, 2022

(86) PCT No.: PCT/JP2022/021834

§ 371 (c)(1),
(2) Date: Nov. 17, 2023

(87) PCT Pub. No.: WO2022/250161

PCT Pub. Date: Dec. 1, 2022

(65) Prior Publication Data

US 2024/0240293 A1 Jul. 18, 2024

(30) Foreign Application Priority Data

May 28, 2021 (JP) ................................ 2021-090689

(51) Int. Cl.

| | |
|---|---|
| ***C22C 38/02*** | (2006.01) |
| ***C21D 1/26*** | (2006.01) |
| ***C21D 3/04*** | (2006.01) |
| ***C21D 6/00*** | (2006.01) |
| ***C21D 8/00*** | (2006.01) |
| ***C21D 8/1216*** | (2026.01) |
| ***C21D 8/1244*** | (2026.01) |
| ***C21D 8/1277*** | (2026.01) |
| ***C21D 9/46*** | (2006.01) |
| ***C22C 38/04*** | (2006.01) |
| ***C23G 1/08*** | (2006.01) |
| ***H01F 1/147*** | (2006.01) |
| ***H01F 1/16*** | (2006.01) |
| *C21D 1/76* | (2006.01) |
| *C21D 8/0278* | (2026.01) |
| *C22C 38/00* | (2006.01) |
| *C22C 38/06* | (2006.01) |
| *C22C 38/60* | (2006.01) |
| *C23C 22/00* | (2006.01) |
| *C23C 22/08* | (2006.01) |
| *C23C 22/74* | (2006.01) |
| *C23C 22/78* | (2006.01) |

(52) U.S. Cl.

CPC ................ *C22C 38/02* (2013.01); *C21D 1/26* (2013.01); *C21D 3/04* (2013.01); *C21D 6/008* (2013.01); *C21D 8/00* (2013.01); *C21D 8/1222* (2013.01); *C21D 8/1233* (2013.01); *C21D 8/1255* (2013.01); *C21D 8/1261* (2013.01); *C21D 8/1266* (2013.01); *C21D 8/1272* (2013.01); *C21D 8/1277* (2013.01); *C21D 8/1283* (2013.01); *C21D 9/46* (2013.01); *C22C 38/04* (2013.01); *C23G 1/08* (2013.01); *H01F 1/147* (2013.01); *H01F 1/16* (2013.01); *C21D 1/76* (2013.01); *C21D 8/0284* (2013.01); *C21D 2201/05* (2013.01); *C22C 38/001* (2013.01); *C22C 38/06* (2013.01); *C22C 38/60* (2013.01); *C23C 22/00* (2013.01); *C23C 22/08* (2013.01); *C23C 22/74* (2013.01); *C23C 22/78* (2013.01)

(58) Field of Classification Search

CPC ............ H01F 1/147; C22C 38/04; C21D 9/46
See application file for complete search history.

(56) References Cited

U.S. PATENT DOCUMENTS

| | | | |
|---|---|---|---|
| 3,932,234 | A | 1/1976 | Imanaka et al. |
| 2010/0122712 | A1 | 5/2010 | Madi et al. |

FOREIGN PATENT DOCUMENTS

| | | | |
|---|---|---|---|
| CN | 101603148 | A | 12/2009 |
| EP | 3395963 | A1 | 10/2018 |
| EP | 3913081 | A1 | 11/2021 |
| JP | S4015644 | B2 | 7/1965 |
| JP | S5113469 | B2 | 4/1976 |
| JP | H08143971 | A | 6/1996 |
| JP | H09143562 | A | 6/1997 |
| JP | 2000129356 | A | 5/2000 |
| JP | 2007169762 | A | 7/2007 |
| KR | 1020110094020 | A | 8/2011 |
| WO | 2020149336 | A1 | 7/2020 |

OTHER PUBLICATIONS

English machine translation of JP 2007-169762 A of Takamiya (Year: 2007).*

(Continued)

*Primary Examiner* — Jophy S. Koshy
(74) *Attorney, Agent, or Firm* — KENJA IP LAW PC

(57) ABSTRACT

To provide a method for producing a grain-oriented electrical steel sheet that can solve the problem of cracking in steel sheets during final cold rolling and that can stably produce a grain-oriented electrical steel sheet with low iron loss. A production method includes predetermined steps, wherein the conditions: $T \leq -4000 \times A + 440$, and $T \leq 360$ are satisfied, where A denotes an average C content in mass % in a predetermined region of the steel sheet after subjection to annealing preceding final cold rolling and before subjection to the final cold rolling, and T denotes a time in hours from just after the completion of the annealing preceding the final cold rolling to just before the start of the final cold rolling, and after the final cold rolling and before the decarburization annealing, pickling treatment is performed with a predetermined treatment solution.

2 Claims, 2 Drawing Sheets

(56) References Cited

OTHER PUBLICATIONS

Aug. 23, 2022, International Search Report issued in the International Patent Application No. PCT/JP2022/021834.
Oct. 21, 2025, Office Action issued by the Korean Intellectual Property Office in the corresponding Korean Patent Application No. 10-2023-7039889 with English language concise statement of relevance.
Nov. 22, 2025, Office Action issued by the China National Intellectual Property Administration in the corresponding Chinese Patent Application No. 202280036687.7 with English language search report.
Oct. 1, 2024, the Extended European Search Report issued by the European Patent Office in the corresponding European Patent Application No. 22811429.4.

* cited by examiner

METHOD FOR PRODUCING GRAIN-ORIENTED ELECTRICAL STEEL SHEET

TECHNICAL FIELD

This disclosure relates to a method for producing a grain-oriented electrical steel sheet.

BACKGROUND

Electrical steel sheets are widely used as iron cores in transformers, motors, and other components. Electrical steel sheets are broadly classified into grain-oriented electrical steel sheets and non-oriented electrical steel sheets. Grain-oriented electrical steel sheets are characterized by the texture in which the <001> orientation, which is an easy magnetization axis of iron, is highly aligned with the rolling direction of the steel sheets. Such a texture is formed by causing secondary recrystallization in final annealing. This secondary recrystallization refers to a phenomenon in which crystal grains in the {110}<001> orientation, so-called Goss orientation, are preferentially grown into giant grains by using grain boundary energy.

A typical technique for producing such secondary recrystallization is to use a precipitate called inhibitor. For example, JP S40-15644 B (PTL 1) describes a method using AlN and MnS are used, and JP S51-13469 B (PTL 2) describes a method using MnS and MnSe, both of which have been in industrial use. These methods using inhibitors are useful for stable growth of secondary recrystallized grains, but for the purpose of fine particle distribution of the inhibitors into the steel, it is necessary to perform slab heating at high temperatures of 1300° C. or higher to make the inhibitor components into a solid solution once.

On the other hand, for a material containing no inhibitor components, a technique for developing crystal grains with Goss orientation through secondary recrystallization is described in, for example, JP2000-129356A (PTL 3). This technique eliminates impurities such as inhibitor components as much as possible and elicits the dependency of grain boundary energy of primary recrystallized grains on the grain boundary misorientation angle, thus causing the secondary recrystallization of grains with Goss orientation without using inhibitors. This effect is called the texture inhibition effect. This method does not require fine particle distribution of the inhibitor in the steel and has manufacturing advantages over the methods using inhibitors, such as not requiring high-temperature slab heating, which was mandatory.

CITATION LIST

Patent Literature

PTL 1: JP S40-15644 B
PTL 2: JP S51-13469 B
PTL 3: JP 2000-129356 A

SUMMARY

Technical Problem

In the production of such grain-oriented electrical steel sheets, cracking of the steel sheets during final cold rolling has been observed in many cases, especially in the material that contains a large amount of C as a component. Furthermore, under conditions that would cause cracking in the steel sheet, the C content in the material after decarburization annealing was high, and in some cases the C content could not be reduced to or below 50 ppm, where magnetic aging does not occur.

It would thus be helpful to provide a method for producing a grain-oriented electrical steel sheet that can solve the aforementioned problem of cracking in steel sheets during final cold rolling and that can stably produce a grain-oriented electrical steel sheet sheet with low iron loss.

Solution to Problem

The following describes the experiments that led to the present disclosure. In the following description, "%" regarding components and concentrations denotes "mass %" unless otherwise noted.

<Experiment 1>

Slabs for grain-oriented electrical steel sheets containing, by mass %, C: 0.060%, Si: 3.08%, Mn: 0.07%, Al: 0.003%, N: 0.003%, and S: 0.003%, with the balance being Fe and inevitable impurities, were each reheated at 1210° C., then subjected to hot rolling to obtain a hot-rolled sheet of 2.4 mm in thickness, then subjected to hot-rolled sheet annealing at 950° C. for 10 seconds, and then subjected to pickling to remove scale on the steel sheet surface. Then, cold rolling was performed to a sheet thickness of 0.70 mm, and then intermediate annealing was performed at 1100° C. for 100 seconds. In the intermediate annealing, the C content in each steel sheet was adjusted in various ways by performing decarburization at this point while varying the dew point in the atmosphere of 60% $H_2$+40% $N_2$. To measure the C content after the intermediate annealing, a small sample was taken at this point, a region ranging from the surface of each steel sheet to the layer at a depth of 1/10 of the sheet thickness (hereinafter referred to as a "1/10 layer") was removed by grinding, and the average C content from the 1/10 layer to the 1/2 layer (i.e., the layer of mid-thickness) was evaluated by the method prescribed in JIS G1211-3:2018.

After the above intermediate annealing was completed, the steel sheets were allowed to stand at room temperature for various times, and then subjected to final cold rolling to a thickness of 0.23 mm. Then, pickling with hydrochloric acid was performed at 50° C. for 5 seconds at 5% acid concentration. Iron(III) chloride hexahydrate had been added in advance to the treatment solution used for the pickling with hydrochloric acid so that the treatment solution contained 5% Fe ions. During the experiment, the concentration level was maintained by adding an aqueous hydrochloric acid solution to the treatment solution, considering the change in the Fe ion concentration as the iron content of each steel sheet dissolved. Then, decarburization annealing was performed at 870° C. for 90 seconds with 50% $H_2$+50% $N_2$ and a dew point of 60° C. Then, an annealing separator mainly composed of MgO was applied to the steel sheet surface, and then each steel sheet was subjected to final annealing in which it was held at 1200° C. for 20 hours in an $H_2$ atmosphere. Then, after the unreacted annealing separator remaining on the steel sheet surface was removed with water washing, a treatment solution mainly composed of phosphate was applied to the steel sheet surface, and then each steel sheet was subjected to flattening annealing, which involved coating baking at 850° C. for 50 seconds combined with flattening of the steel sheet.

In this experiment, each steel sheet after subjection to the final cold rolling was evaluated for crack-like defects using a defect inspection device of eddy current sensor type, based on the number of defects per 1000 m length of steel sheet. The evaluation results are illustrated in FIG. 1, organized by the C content in the steel after the intermediate annealing and the time from just after the completion of the intermediate annealing to just before the start of the final cold rolling (hereinafter referred to as "waiting time"). As clearly seen from the figure, the number of defects tends to be higher as the waiting time from just after the intermediate annealing to just before the start of the final cold rolling is longer, and that the higher the C content after the intermediate annealing, the shorter the waiting time when the number of defects exceeds 3.

In order to clarify the cause of this problem, in this experiment, the microstructures of samples before cold rolling with a C content of 0.044% after intermediate annealing and a waiting time of 100 hours (0.2 defects: Condition A) and 360 hours (4.8 defects: Condition B) were investigated using a scanning electron microscope. The results demonstrated that Condition A had fine needle carbides of about 1 μm in the steel, whereas Condition B had coarse carbides of more than 3 μm.

The results of this investigation suggest that the occurrence of defects during final cold rolling is due to the effects of coarse carbides. In other words, stress concentration may occur at the interface between the coarse carbides and the steel substrate during cold rolling, which may become the origin of defects such as cracking. In Condition B, the number of defects is 4.8 per 1000 m, which is a large deviation from the number and frequency of coarse carbides obtained from the above observation, but presumably the carbides that would cause cracking are very large and occur with low frequency. Therefore, Condition B is considered to be more likely to produce such carbides than Condition A.

Next, the reasons for setting the number of defects at 3 as the threshold are described below. When a defect occurs on a steel sheet, the defective portion should be removed by a slitter line or other means. Upon removal, the coil is split into parts. Assuming that the three defects are evenly distributed in the longitudinal direction over a length of 1000 m, the calculation is that a 1000 m coil is split into four 250 m coils. The weight of each 250 m coil would be about 0.55 tonnes, assuming a sheet thickness of 0.23 mm and a sheet width of 1200 mm. Typical slitter lines are designed to handle about 10 tonnes to 40 tonnes of coils, and when the coils handled are less than 0.5 tonnes, the sheet passage performance and controllability of the line become significantly inferior. To prevent such defects from occurring, the number of defects per 1000 m should be kept no more than 3.

Based on the above experimental results, in order to avoid the occurrence of cracking in the steel sheet during cold rolling, the present inventors have come to realize that the following conditions should be satisfied:

$$T \leq -4000 \times A + 440,$$

and $$T \leq 360,$$

where A denotes an average C content in mass % in a region ranging from a 1/10 layer to a 1/2 layer of a steel sheet after subjection to annealing preceding final cold rolling and before subjection to the final cold rolling, and T denotes a time in hours from just after the completion of the annealing preceding the final cold rolling to just before the start of the final cold rolling.

Based on the above ideas, it is presumed that the carbide size also affects the C content in the steel after decarburization annealing, and thus the C content of the product sheet. In decarburization, C in the steel diffuses into the surface layer of the steel sheet and is subsequently eliminated from the steel as CO and CO2 under the influence of the furnace atmosphere. If a carbide is coarse, C begins to diffuse at the surface layer of the carbide, but in the interior, it continues to remain in place, which may inhibit decarburization.

Therefore, in order to evaluate the effect of decarburization, Experiment 2 was conducted by changing the pickling conditions before decarburization annealing under the conditions on the boundary between O and x (dotted line) in FIG. 1, where the C content after intermediate annealing was 0.035% and the waiting time was 300 hours.

<Experiment 2>

Steel sheets after subjection to final cold rolling that satisfied the conditions of the C content after intermediate annealing of 0.035% and the waiting time of 300 hours were pickled with hydrochloric acid solutions (treatment solutions) at 60° C. with various acid concentrations. Furthermore, Fe ions at various concentrations were included by adding iron(III) chloride hexahydrate to the hydrochloric acid solution in advance. During the experiment, the concentration level was maintained by adding an aqueous hydrochloric acid solution, considering the change in the Fe ion concentration as the iron content of the steel sheet dissolved. Then, decarburization annealing was performed at 870° C. for 90 seconds with 50% $H_2$+50% $N_2$ and a dew point of 60° C. Then, an annealing separator mainly composed of MgO was applied to the steel sheet surface, and then each steel sheet was subjected to final annealing in which it was held at 1200° C. for 20 hours in an $H_2$ atmosphere. Then, after the unreacted annealing separator remaining on the steel sheet surface was removed with water washing, a treatment solution mainly composed of phosphate was applied to the steel sheet surface, and then each steel sheet was subjected to flattening annealing, which involved coating baking at 850° C. for 50 seconds combined with flattening of the steel sheet.

After removing the film from each obtained steel sheet by pickling with hydrochloric acid at 5% concentration and 90° C., the C content in the steel substrate of the steel sheet as a finished product was analyzed by the method prescribed in JIS G1211-3:2018. FIG. 2 illustrates the results of the investigation of the dependence on the pickling conditions prior to decarburization annealing, in which the case of the C content being 50 ppm or less, where magnetic aging can be suppressed, is designated as "O" and the case of the C content being more than 50 ppm is designated as "x". As seen from the figure, to obtain the C content in the steel that does not cause magnetic aging, the hydrochloric acid concentration should be 1% or more and 20% or less and the Fe ion concentration should be 2% or more and 15% or less.

As described above, the present inventors have newly discovered that by specifying the time from just after annealing preceding final cold rolling to just before the start of the final cold rolling, and by performing pickling treatment before decarburization annealing and including Fe ions in the treatment solution at a certain ratio, it is possible to effectively prevent the occurrence of defects during the final cold rolling and reduce the C content of the product sheet, thereby suppressing magnetic aging.

The present disclosure is based on the above discoveries.

Specifically, primary features of the present disclosure are as follows.

1. A method for producing a grain-oriented electrical steel sheet, comprising: subjecting a steel material to hot rolling to obtain a hot-rolled steel sheet; subjecting the hot-rolled steel sheet to cold rolling once, or twice or more with intermediate annealing in between, to obtain a cold-rolled steel sheet having a final sheet thickness; then subjecting the cold-rolled steel sheet to decarburization annealing; then applying an annealing separator to a surface of the steel sheet; and then subjecting the steel sheet to final annealing, wherein the following conditions are satisfied:

$$T \leq -4000 \times A + 440,$$

and $$T \leq 360,$$

where A denotes an average C content in mass % in a region ranging from 1/10 to 1/2 of a sheet thickness below the surface of the steel sheet after subjection to annealing preceding final cold rolling and before subjection to the final cold rolling, and T denotes a time in hours from just after the completion of the annealing preceding the final cold rolling to just before the start of the final cold rolling, and after the final cold rolling and before the decarburization annealing, pickling treatment is performed with a treatment solution having an acid concentration of 1 mass % or more and 20 mass % or less and an Fe ion content of 2 mass % or more and 15 mass % or less.

As used herein, in the case of performing cold rolling once, that cold rolling corresponds to the final cold rolling, and in the case of performing cold rolling twice or more, the cold rolling performed in the last session corresponds to the final cold rolling. The annealing performed just before this final cold rolling corresponds to the annealing preceding the final cold rolling. Specifically, in the case of performing cold rolling once, hot-rolled sheet annealing corresponds to the annealing preceding the final cold rolling, and in the case of performing cold rolling twice or more, intermediate annealing corresponds to the annealing preceding the final cold rolling.

2. The method for producing a grain-oriented electrical steel sheet according to aspect 1, wherein the acid used in the pickling treatment is selected from the group consisting of phosphoric acid, hydrochloric acid, sulfuric acid, and nitric acid.

3. The method for producing a grain-oriented electrical steel sheet according to aspect 1 or 2, wherein the decarburization annealing is divided into earlier-stage annealing and later-stage annealing, the earlier-stage annealing is performed in an annealing atmosphere with an atmospheric oxidizability $P(H_2O)/P(H_2)$ of 0.3 or more and 0.7 or less, and the later-stage annealing is performed in an annealing atmosphere with an atmospheric oxidizability $P(H_2O)/P(H_2)$ of 0.005 or more and 0.2 or less.

Advantageous Effect

According to the present disclosure, magnetic aging can be suppressed by preventing the occurrence of defects during final cold rolling and reducing the C content in the product sheet, thus enabling stable production of a grain-oriented electrical steel sheet with low iron loss.

DETAILED DESCRIPTION

Figure 1:
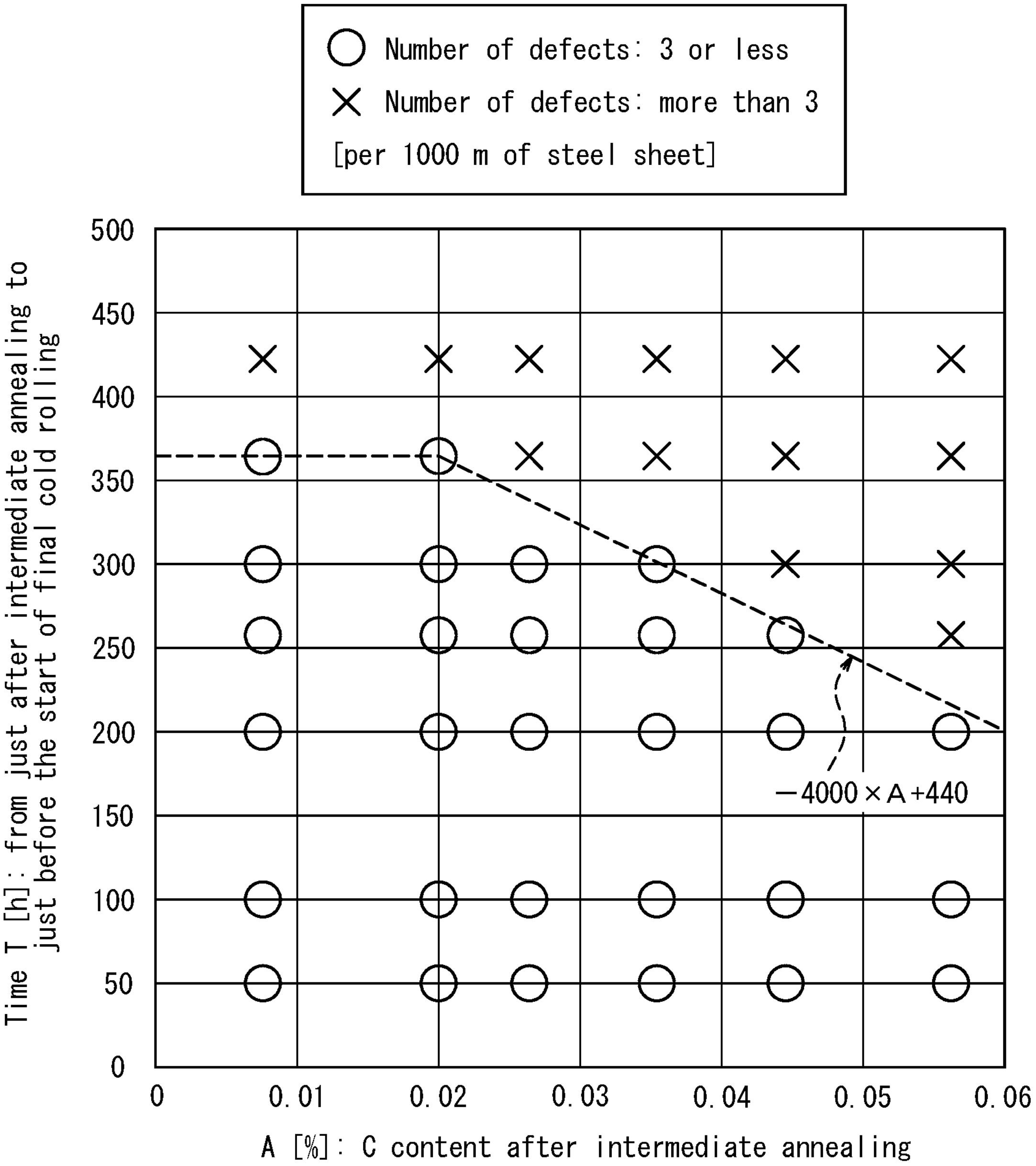
FIG. 1 illustrates the relationship between the C content in the steel after intermediate annealing and the time from just after intermediate annealing to just before the start of final cold rolling, and the number of defects after the final cold rolling.
Figure 2:
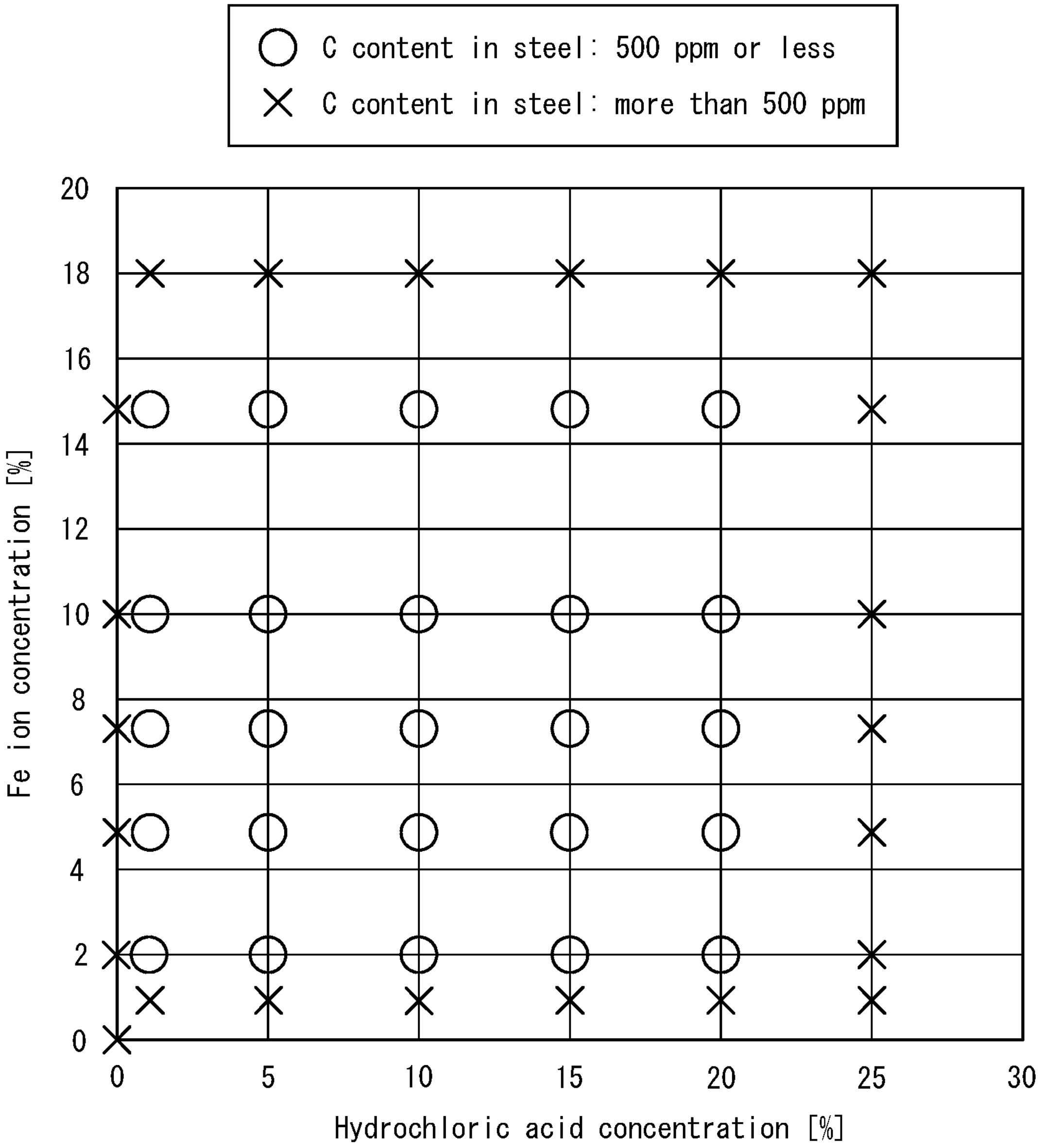
FIG. 2 illustrates the relationship between the pickling conditions and the C content in the steel substrate of the steel sheet as a finished product.

The present disclosure will be described in detail hereinafter.

<Steel Material>

First of all, although the chemical composition of the steel material (steel slab) of the grain-oriented electrical steel sheet is not particularly limited in the present disclosure, the following describes preferred ranges of the chemical composition.

C: 0.01% or More and 0.10% or Less

If the C content exceeds 0.10%, it becomes difficult to reduce the C content to or below 50 ppm, where magnetic aging does not occur after decarburization annealing. Therefore, the C content is preferably 0.10% or less. On the other hand, if the C content is less than 0.01%, the grain boundary strengthening effect of C is lost, which may cause cracking in the slab and other defects that interfere with operability. Therefore, the C content is preferably 0.01% or more. The C content is preferably 0.10% or less. It is more preferably 0.03% or more. It is more preferably 0.06% or less.

Si: 2.0% or More and 5.0% or Less

Si is a useful element for increasing the specific resistance of steel to reduce iron loss. However, a Si content below 2.0% is not effective. On the other hand, if its content exceeds 5.0%, the workability of the steel may deteriorate, making rolling difficult. Therefore, the Si content is preferably 2.0% or more. The Si content is preferably 5.0% or less. It is more preferably 3.0% or more. It is more preferably 3.6% or less.

Mn: 0.01% or More and 0.50% or Less

Mn is a useful element for yielding good hot workability. However, a Mn content below 0.01% is not effective. Therefore, the Mn content is preferably 0.01% or more. On the other hand, if its content exceeds 0.50%, the magnetic flux density of the product sheet decreases. Therefore, the Mn content is preferably 0.50% or less. It is more preferably 0.03% or more. It is more preferably 0.15% or less.

Furthermore, in the case of the chemical composition utilizing inhibitors, when MnS or MnSe is used, one or both of S and Se may also be contained in the total content of 0.005% or more and 0.100% or less, in addition to the above Mn content. Alternatively, when AlN is used, the chemical composition may contain Al: 0.01% or more and 0.04% or less and N: 0.003% or more and 0.010% or less. If both MnS or MnSe and AlN are used, the sum of these can be used.

In the case of the chemical composition not utilizing inhibitors, the content of Al, N, S, and Se can be reduced as much as possible, and secondarily recrystallization of Goss grains can be attained by the texture inhibition effect. As such, it is possible to use the steel material with Al: 0.010% or less and N: 0.0060% or less, and one or both of S and Se:

0.010% or less in total. However, since reduction of the content of these elements causes an increase in cost, it is allowable to contain these elements in an amount of more than 0%. Preferably, the Al content is 0.008% or less, the N content is 0.0050% or less, and the total content of one or both of S and Se is 0.007% or less.

Although the basic components according to the present disclosure have been described above, the chemical composition disclosed herein may also contain other optional components, specifically, the elements described below as appropriate.

Specifically, for the purpose of improving the magnetic properties, the chemical composition may contain at least one selected from the group consisting of Ni: more than 0% and 1.50% or less, Cr: more than 0% and 0.50% or less, Cu: more than 0% and 0.50% or less, P: more than 0% and 0.50% or less, Sb: more than 0% and 0.50% or less, Sn: more than 0% and 0.50% or less, Bi: more than 0% and 0.50% or less, Mo: more than 0% and 0.50% or less, B: more than 0 ppm and 25 ppm or less, Nb: more than 0% and 0.020% or less, V: more than 0% and 0.010% or less, Zr: more than 0% and 0.10% or less, Co: more than 0% and 0.050% or less, Pb: more than 0% and 0.0100% or less, As: more than 0% and 0.0200% or less, Zn: more than 0% and 0.020% or less, W: more than 0% and 0.0100% or less, Ge: more than 0% and 0.0050% or less, and Ga: more than 0% and 0.0050% or less. If the content of each added element exceeds the corresponding upper limit, the growth of secondary recrystallized grains may be suppressed and magnetic properties may deteriorate.

The steel material disclosed herein may have a chemical composition containing (consisting of) the above basic components and, in some cases, the above optional components, with the balance being Fe and inevitable impurities.

For example, the steel material may have a chemical composition containing (consisting of)

C: 0.01% or more and 0.10% or less,
Si: 2.0% or more and 5.0% or less,
Mn: 0.01% or more and 0.50% or less, and
one or both groups of:
group α: Al: 0.01% or more and 0.04% or less and N: 0.003% or more and 0.010% or less, and
group β: one or both of S and Se: 0.005% or more and 0.100% or less in total, with the balance being Fe and inevitable impurities.

Alternatively, the steel material may have a chemical composition containing (consisting of)

C: 0.01% or more and 0.10% or less,
Si: 2.0% or more and 5.0% or less,
Mn: 0.01% or more and 0.50% or less,
Al: 0.010% or less,
N: 0.0060% or less, and
one or both of S and Se: 0.010% or less in total,
with the balance being Fe and inevitable impurities.

The chemical composition of the steel material may further contain at least one selected from the group consisting of Ni: more than 0% and 1.50% or less,
Cr: more than 0% and 0.50% or less,
Cu: more than 0% and 0.50% or less,
P: more than 0% and 0.50% or less,
Sb: more than 0% and 0.50% or less,
Sn: more than 0% and 0.50% or less,
Bi: more than 0% and 0.50% or less,
Mo: more than 0% and 0.50% or less,
B: more than 0 ppm and 25 ppm or less,
Nb: more than 0% and 0.020% or less, V: more than 0% and 0.010% or less,
Zr: more than 0% and 0.10% or less,
Co: more than 0% and 0.050% or less,
Pb: more than 0% and 0.0100% or less,
As: more than 0% and 0.0200% or less,
Zn: more than 0% and 0.020% or less,
W: more than 0% and 0.0100% or less,
Ge: more than 0% and 0.0050% or less, and
Ga: more than 0% and 0.0050% or less.

<Production Process>

Steel material with the above components may be produced as a slab by the usual ingot casting or continuous casting, or as a thin slab or thinner cast steel with a thickness of 100 mm or less by direct casting. Although the slab or thin slab or thinner cast steel as the steel material is reheated in a usual manner and then hot rolled, it may be subjected to hot rolling just after casting without heating. In the case of the chemical composition using an inhibitor, the above reheating temperature is preferably 1300° C. or higher to dissolve the inhibitor components into a solid solution. On the other hand, in the case of not using an inhibitor, the reheating temperature is preferably below 1300° C. from a cost perspective.

After the reheating, it is preferable from the perspective of microstructural control of a hot-rolled sheet to perform at least one pass of rough rolling at 900° C. or higher and 1200° C. or lower, followed by two or more passes of finish rolling at 700° C. or higher and 1000° C. or lower. In addition, from the view point of both microstructural control of carbide and preventing defects such as cracking, the coiling temperature is preferably set to 400° C. or higher. From the same viewpoint, the coiling temperature is preferably set to 750° C. or lower. The coiling temperature is more preferably 500° C. or higher. The coiling temperature is more preferably 700° C. or lower.

After the hot rolling, hot-rolled sheet annealing may be performed if necessary. When hot-rolled sheet annealing is performed, the microstructure can be homogenized and the variation in magnetic properties can be reduced.

From the viewpoint of this microstructural homogenization, the hot-rolled sheet annealing conditions preferably include holding the sheet sheet in a temperature range from 800° C. to 1250° C. for 5 seconds or more. The holding temperature is more preferably 900° C. or higher. It is more preferably 1150° C. or lower. In this holding temperature range, the holding time is preferably 10 seconds or more. In this holding temperature range, the holding time is preferably 180 seconds or less. In terms of morphological control of the secondary phase and precipitates, cooling after the holding is performed with a cooling rate in the temperature range from 800° C. to 350° C. of preferably 5° C./s or higher. The cooling rate in this temperature range is preferably 100° C./s or lower. It is more preferably 15° C./s or higher. It is more preferably 45° C./s or lower.

Then, it is preferable to remove the scale on the steel sheet surface formed during the hot rolling. To this end, known methods may be followed, such as using heated acid or mechanically removing scale. After the scale removal, cold rolling is performed once, or twice or more with intermediate annealing in between, to obtain a final sheet thickness, and then decarburization annealing is performed. When intermediate annealing is performed, it is preferable from the microstructural control perspective to hold the product in a temperature range from 800° C. to 1250° C. for 5 seconds or more. In cooling after the holding during the intermediate annealing, in terms of morphological control of the second phase and precipitates, the cooling is performed with a cooling rate in the temperature range from 800° C. to 350° C. of preferably 5° C./s or higher. The cooling rate in this temperature range is preferably 100° C./s or lower. It is more preferably 15° C./s or higher. It is more preferably 45° C./s or lower. Before the intermediate annealing, the steel sheet is preferably degreased to remove the rolling oil originating from the preceding step. On the other hand, after the intermediate annealing, it is preferably to remove scale from the steel sheet surface. To this end, known methods may be followed, such as using heated acid or mechanically removing scale.

In the cold rolling, a lubricant such as rolling oil is preferably used to reduce the rolling load and improve the rolling shape. To obtain a good recrystallized texture before secondary recrystallization, the total rolling reduction ratio of final cold rolling is preferably 50% or more. It is preferably 92% or less.

In this case, in order to avoid the occurrence of cracking in the steel sheet during the cold rolling, the present inventors have come to realize that the following conditions should be satisfied:

$$T \leq -4000 \times A + 440,$$

and $$T \leq 360,$$

where A denotes an average C content in mass % in a region ranging from a 1/10 layer to a 1/2 layer of the steel sheet after subjection to annealing preceding final cold rolling and before subjection to the final cold rolling, and T denotes a time in hours from just after the completion of the annealing preceding the final cold rolling to just before the start of the final cold rolling.

After the final cold rolling, the cold-rolled steel sheet is subjected to decarburization annealing. In the present disclosure, it is essential that pickling treatment be performed before the decarburization annealing. At this point, it is important that pickling treatment be performed using a treatment solution with an acid concentration of 1% or more and 20% or less and an Fe ion content of 2% or more and 15% or less, for the reasons mentioned above. Examples of the acid in the treatment solution include, without are not limited to, phosphoric acid, hydrochloric acid, sulfuric acid, and nitric acid. The acids may be used alone or in combination, preferably in the form of an aqueous solution.

The Fe ion content of the treatment solution can be adjusted by adding iron compounds to the treatment solution. Iron compounds include iron(III) chloride hexahydrate and iron(III) phosphate. The iron compounds may be used alone or in combination.

The Fe ion concentration can be calculated, for example, by measuring the conductivity, liquid temperature, and ultrasonic propagation velocity of the acid solution using an ultrasonic concentration measuring device. In the above experiments and the following examples, the acid concentration and Fe ion concentration were measured using an ultrasonic concentration measuring device manufactured by Fuji Kogyo Co., Ltd.

The iron content of the steel sheet dissolves during treatment, causing the Fe concentration of the treatment solution to fluctuate. It is thus preferable to keep the Fe concentration constant by adding an aqueous solution of acid. The acid can be any of those exemplified above for use in the treatment.

In the decarburization annealing, it is preferable that the cold-rolled steel sheet be held in a temperature range from 750° C. to 950° C. for 10 seconds or more, that the atmospheric gas contain $H_2$ and $N_2$, and that the decarburization annealing be performed partially or entirely in a wet atmosphere with a dew point of 20° C. or higher and 80° C. or lower. The holding temperature is more preferably 800° C. or higher. The holding temperature is more preferably 900° C. or lower. In this temperature range, the dew point is more preferably 30° C. or higher. In this temperature range, the dew point is more preferably 70° C. or lower.

Furthermore, in a case where the decarburization annealing is divided into earlier-stage annealing and later-stage annealing, it is preferable that the earlier-stage annealing be performed in an annealing atmosphere with an atmospheric oxidizability $P(H_2O)/P(H_2)$ of 0.30 or more and 0.70 or less, and the later-stage annealing be performed in an annealing atmosphere with an atmospheric oxidizability $P(H_2O)/P(H_2)$ of 0.005 or more and 0.20 or less. The reason is that this setup causes some of the fayalite formed near the surface during annealing in a more-oxidized condition to be transformed into silica during annealing in a less-oxidized condition, improving the film properties. Within the above temperature range, holding temperature may be different between the earlier-stage annealing and the later-stage annealing, and the holding temperature in the later-stage annealing may be higher or lower than that in the earlier-stage annealing. The holding time of the earlier-stage annealing and the later-stage annealing is preferably at least 10% each as a percentage of the total holding time in the decarburization annealing.

Subsequently, an annealing separator mainly composed of MgO is preferably applied to the steel sheet surface at 2.5 $g/m^2$ or more per surface. As used herein, the phrase "mainly composed of MgO" means that the MgO content in the annealing separator is 60% or more in terms of solid content. The content of MgO in the annealing separator is preferably 80% or more in terms of solid content.

MgO may be applied to steel sheets in slurry form, or in dry form by electrostatic coating. During application of slurry, the slurry solution is preferably held at a constant temperature to prevent viscosity increase. The constant temperature is preferably 5° C. or higher. The constant temperature is preferably 30° C. or lower. In order to maintain a constant concentration of the slurry to be applied, the slurry solution is preferably separated into two tanks, one for preparation and the other for application. Subsequently, final annealing can be performed to develop secondary recrystallized grains and form a forsterite film.

Then, coils are annealed in an upended state because the final annealing generally takes a long time. It is preferable to wrap a band or other means around the coil before subjection to the final annealing to prevent the outer winding of the upended coil from unraveling. In the final annealing, to complete the secondary recrystallization, the temperature is preferably raised to 800° C. or higher, or to 1050° C. or higher if a forsterite film is to be formed. Also, in order to purify inhibitor-forming elements and the like from the steel and obtain good iron loss properties, it is preferable that the steel sheet be held at a temperature ranging from 1050° C. to 1300° C. for 3 hours or more, and an atmosphere containing $H_2$ be introduced partially or entirely within the temperature range of 1050° C. or higher. After the final annealing, washing, brushing, or pickling is useful to remove the attached annealing separator. Then, flattening annealing is performed to correct the shape, which is useful for iron loss reduction.

Since electrical steel sheets are often stacked on top of one another when used, it is effective to apply an insulating coating to the steel sheet surface to ensure insulation. The coating is preferably a coating that can add tension to the steel sheet to reduce iron loss. As the coating, a coating solution may be applied prior to flattening annealing and baked in the flattening annealing. It is also preferable to apply a tension coating applying method with a binder, or a method that allows inorganic materials to be deposited as a coating on the surface layer of the steel sheet through physical vapor deposition or chemical vapor deposition, because it may provide excellent coating adhesion and significant iron loss reduction effects.

Example 1

Slabs for grain-oriented electrical steel sheets consisting of, by mass %, C: 0.092%, Si: 3.45%, Mn: 0.14%, Al: 0.022%, N: 0.007%, and S: 0.005%, with the balance being Fe and inevitable impurities, were each reheated at 1420° C., then subjected to hot rolling to obtain a hot-rolled sheet of 2.4 mm in thickness, then subjected to hot-rolled sheet annealing at 1080° C. for 25 seconds, and then subjected to pickling to remove scale on the steel sheet surface. Then, cold rolling was performed to a sheet thickness of 0.50 mm, and then intermediate annealing was performed at 1100° C. for 100 seconds. In the intermediate annealing, the C content in each steel sheet was adjusted by varying the dew point in the atmosphere of 60% $H_2$+40% $N_2$. To measure the C content after the intermediate annealing, a small sample was taken at this point, a region ranging from the surface to the 1/10 layer of each steel sheet was removed by grinding, and the average C content from the 1/10 layer to the 1/2 layer was evaluated by the method prescribed in JIS G1211-3:2018. The results are listed in Table 1.

After the intermediate annealing was completed, the steel sheets were respectively allowed to stand for the times listed in Table 1, and then subjected to final cold rolling to a thickness of 0.23 mm. Then, pickling treatment was performed with a hydrochloric acid solution at 5% acid concentration at 70° C. for 3 seconds. Iron(III) chloride hexahydrate had been added in advance to the hydrochloric acid solution so that the solution contained 7% Fe ions. During the pickling, the concentration level was maintained by adding an aqueous hydrochloric acid solution to the hydrochloric acid solution, considering the change in the Fe ion concentration as the iron content of the steel sheet dissolved. Then, decarburization annealing was performed in the earlier stage (first half) at 835° C. for 120 seconds, 50% $H_2$+50% $N_2$, and dew point of 63° C. (oxidizability: 0.59), and in the later stage (second half) at 835° C. for 20 seconds, 50% $H_2$+50% $N_2$, and dew point of 30° C. (oxidizability: 0.09). Then, an annealing separator mainly composed of MgO was applied to the steel sheet surface, and then each steel sheet was subjected to final annealing in which it was held at 1200° C. for 10 hours in an $H_2$ atmosphere. Then, after the unreacted annealing separator remaining on the steel sheet surface was removed with water washing, a treatment solution mainly composed of phosphate was applied to the steel sheet surface, and then each steel sheet was subjected to flattening annealing, which involved coating baking at 850° C. for 50 seconds combined with flattening of the steel sheet.

The iron loss $W_{17/50}$ (iron loss at a magnetic flux density of 1.7 T and 50 Hz excitation) of each obtained steel sheet was measured by the method prescribed in JIS C2550-1 (2011). After removing the coating and film from each obtained steel sheet by pickling with hydrochloric acid at 5% concentration and 90° C. for 180 seconds, the C content in the steel substrate of the steel sheet as a finished product was analyzed by the method prescribed in JIS G1211-3:2018. The results are listed in Table 1. In this example, each steel sheet after subjection to the final cold rolling was evaluated for crack-like defects using a defect inspection device of eddy current sensor type, based on the number of defects per 1000 m. The results are also listed in Table 1.

As can be seen from Table 1, according to the present disclosure, it is possible to obtain a grain-oriented electrical steel sheet that has few defects after subjection to final cold rolling, excellent iron loss properties, and a C content in steel not causing magnetic aging.

TABLE 1

| No. | A: average C content after annealing preceding final cold rolling (%) | T: time from just after the completion of intermediate annealing to just before the start of final cold rolling (hours) | −4000 × A + 440 (a.u.) | Iron loss $W_{17/50}$ (W/kg) | Number of defects after final cold rolling (counts) | C content in the steel sheet as a finished product (ppm) | Remarks |
|---|---|---|---|---|---|---|---|
| 1 | 0.011 | 95 | 396 | 0.854 | 2.1 | 8 | Example |
| 2 | 0.011 | 385 | 396 | 0.839 | 11.1 | 42 | Comparative example |
| 3 | 0.021 | 24 | 356 | 0.850 | 0.6 | 13 | Example |
| 4 | 0.021 | 95 | 356 | 0.822 | 0.8 | 13 | Example |
| 5 | 0.021 | 160 | 356 | 0.837 | 1.6 | 18 | Example |
| 6 | 0.021 | 280 | 356 | 0.847 | 2.4 | 19 | Example |
| 7 | 0.046 | 24 | 256 | 0.834 | 0.5 | 14 | Example |
| 8 | 0.046 | 95 | 256 | 0.845 | 0.8 | 15 | Example |
| 9 | 0.046 | 160 | 256 | 0.846 | 1.7 | 24 | Example |
| 10 | 0.046 | 280 | 256 | 0.859 | 4.3 | 55 | Comparative example |
| 11 | 0.075 | 24 | 140 | 0.843 | 1.0 | 18 | Example |
| 12 | 0.075 | 95 | 140 | 0.834 | 1.3 | 20 | Example |
| 13 | 0.075 | 140 | 140 | 0.842 | 1.4 | 21 | Example |
| 14 | 0.075 | 160 | 140 | 0.849 | 3.7 | 44 | Comparative example |
| 15 | 0.075 | 280 | 140 | 0.839 | 6.6 | 70 | Comparative example |
| 16 | 0.088 | 24 | 88 | 0.855 | 1.6 | 19 | Example |
| 17 | 0.088 | 95 | 88 | 0.840 | 3.5 | 37 | Comparative example |
| 18 | 0.088 | 160 | 88 | 0.830 | 7.1 | 50 | Comparative example |
| 19 | 0.088 | 280 | 88 | 0.836 | 12.6 | 90 | Comparative example |

Underlined if outside the scope of disclosure

Example 2

Slabs for grain-oriented electrical steel sheets consisting of, by mass %, C: 0.045%, Si: 3.20%, Mn: 0.06%, Al: 0.004%, N: 0.003%, S: 0.004%, and Sb: 0.035%, with the balance being Fe and inevitable impurities, were each reheated at 1230° C., then subjected to hot rolling to obtain a hot-rolled sheet of 2.2 mm in thickness, then subjected to hot-rolled sheet annealing at 1100° C. for 25 seconds, and then subjected to pickling to remove scale on the steel sheet surface. The hot-rolled sheet annealing was performed under the conditions of the atmosphere of 50% $H_2$+50% $N_2$ and the dew point of 60° C. To measure the C content after the hot-rolled sheet annealing, a small sample was taken at the end of the process, a region ranging from the surface to the 1/10 layer of each steel sheet was removed by grinding, and the average C content from the 1/10 layer to the 1/2 layer was evaluated by the method prescribed in JIS G1211-3:2018. The C content after the hot-rolled sheet annealing was determined to be 0.034%.

After the completion of the hot-rolled sheet annealing, final cold rolling was performed after a 75-hour waiting period to finish the steel sheet to a thickness of 0.23 mm. Then, pickling treatment was performed with the hydrochloric acid solutions at 70° C. for 3 seconds at the acid concentrations listed in Table 2. Iron(III) chloride hexahydrate had been added in advance to the hydrochloric acid solution so that the solution contained Fe ions at the concentrations listed in Table 2. During the pickling, the concentration level was maintained by adding an aqueous hydrochloric acid solution to the hydrochloric acid solution, considering the change in the Fe ion concentration as the iron content of the steel sheet dissolved. Then, decarburization annealing was performed at 830° C. for 90 seconds with 55% $H_2$+45% $N_2$ and a dew point of 65° C. Then, an annealing separator mainly composed of MgO was applied to the steel sheet surface, and then each steel sheet was subjected to final annealing in which it was held at 1200° C. for 10 hours in an $H_2$ atmosphere. Then, after the unreacted annealing separator remaining on the steel sheet surface was removed with water washing, a treatment solution mainly composed of phosphate was applied to the steel sheet surface, and then each steel sheet was subjected to flattening annealing, which involved coating baking at 840° C. for 20 seconds combined with flattening of the steel sheet.

The iron loss $W_{17/50}$ (iron loss at a magnetic flux density of 1.7 T and 50 Hz excitation) of each obtained steel sheet was measured by the method prescribed in JIS C2550-1 (2011). After removing the coating and film from each obtained steel sheet by pickling with hydrochloric acid at 5% concentration and 90° C. for 180 seconds, the C content in the steel substrate of the steel sheet as a finished product was analyzed by the method prescribed in JIS G1211-3: 2018. The results are listed in Table 2. In this example, each steel sheet after subjection to the final cold rolling was evaluated for crack-like defects using a defect inspection device of eddy current sensor type, based on the number of defects per 1000 m. The results are also listed in Table 2.

As can be seen from Table 2, according to the present disclosure, it is possible to obtain a grain-oriented electrical steel sheet that has few defects after subjection to final cold rolling, excellent iron loss properties, and a C content in steel not causing magnetic aging.

TABLE 2

| No. | Acid concentration (%) | Fe ion concentration (%) | Iron loss $W_{17/50}$ (W/kg) | Number of defects after final cold rolling (counts) | C content in the steel sheet as a finished product (ppm) | Remarks |
|---|---|---|---|---|---|---|
| 20 | 0 (without pickling treatment) | | 0.850 | 0.7 | 80 | Comparative Example |
| 21 | 3 | 1 | 0.818 | 1.4 | 70 | Comparative example |
| 22 | 3 | 5 | 0.825 | 0.6 | 22 | Example |
| 23 | 3 | 20 | 0.814 | 0.3 | 55 | Comparative example |
| 24 | 5 | 1 | 0.840 | 2.3 | 59 | Comparative example |
| 25 | 5 | 2 | 0.835 | 1.8 | 20 | Example |
| 26 | 5 | 5 | 0.833 | 1.3 | 14 | Example |
| 27 | 5 | 10 | 0.849 | 2.3 | 12 | Example |
| 28 | 5 | 15 | 0.838 | 1.5 | 12 | Example |
| 29 | 5 | 20 | 0.837 | 0.6 | 60 | Comparative example |
| 30 | 7 | 1 | 0.812 | 2.3 | 55 | Comparative example |
| 31 | 7 | 5 | 0.844 | 1.2 | 9 | Example |
| 32 | 7 | 20 | 0.826 | 1.3 | 70 | Comparative example |
| 33 | 12 | 1 | 0.821 | 2.1 | 60 | Comparative example |
| 34 | 12 | 5 | 0.848 | 2.2 | 20 | Example |
| 35 | 12 | 20 | 0.810 | 0.4 | 60 | Comparative example |
| 36 | 18 | 1 | 0.824 | 0.5 | 60 | Comparative example |
| 37 | 18 | 5 | 0.822 | 1.0 | 16 | Example |
| 38 | 18 | 20 | 0.820 | 0.7 | 60 | Comparative example |
| 39 | 22 | 1 | 0.823 | 1.9 | 80 | Comparative example |
| 40 | 22 | 5 | 0.820 | 1.5 | 55 | Comparative example |
| 41 | 22 | 20 | 0.823 | 1.4 | 90 | Comparative example |

Underlined if outside the scope of disclosure

Example 3

Slabs for grain-oriented electrical steel sheets consisting of, by mass %, C: 0.061%, Si: 2.87%, Mn: 0.25%, Se: 0.025%, and Mo: 0.019%, with the balance being Fe and inevitable impurities, were each reheated at 1350° C., then subjected to hot rolling to obtain a hot-rolled sheet of 3.0 mm in thickness, then subjected to hot-rolled sheet annealing at 950° C. for 100 seconds, and then subjected to pickling to remove scale on the steel sheet surface. Then, cold rolling was performed to a sheet thickness of 1.2 mm, and then intermediate annealing was performed at 1080° C. for 30 seconds. The intermediate annealing was performed under the conditions of the atmosphere of 40% $H_2$+60% $N_2$ and the dew point of 50° C. To measure the C content after the intermediate annealing, a small sample was taken at this point, a region ranging from the surface to the 1/10 layer of each steel sheet was removed by grinding, and the average C content from the 1/10 layer to the ½ layer was evaluated by the method prescribed in JIS G1211-3:2018. The C content after the hot-rolled sheet annealing was determined to be 0.050%.

After the completion of the intermediate annealing, final cold rolling was performed after a 200-hour waiting period to finish the steel sheet to a thickness of 0.27 mm. The type of acid was then changed as described in Table 3, and pickling treatment was performed at 5% acid concentration and 65° C. for 5 seconds in each case. Iron(III) chloride hexahydrate had been added in advance to the acid solution so that the solution contained Fe ions at the concentrations listed in Table 3. During the pickling, the concentration level was maintained by adding an aqueous hydrochloric acid solution to the acid solution, considering the change in the Fe ion concentration as the iron content of the steel sheet dissolved. Then, decarburization annealing was performed at 850° C. for 150 seconds with 50% $H_2$+50% $N_2$ and a dew point of 60° C. Then, an annealing separator mainly composed of MgO was applied to the steel sheet surface, and then each steel sheet was subjected to final annealing in which it was held at 1200° C. for 10 hours in an $H_2$ atmosphere. Then, after the unreacted annealing separator remaining on the steel sheet surface was removed with water washing, a treatment solution mainly composed of phosphate was applied to the steel sheet surface, and then each steel sheet was subjected to flattening annealing, which involved coating baking at 850° C. for 20 seconds combined with flattening of the steel sheet.

The iron loss $W_{17/50}$ (iron loss at a magnetic flux density of 1.7 T and 50 Hz excitation) of each obtained steel sheet was measured by the method prescribed in JIS C2550-1 (2011). After removing the coating and film from each obtained steel sheet by pickling with hydrochloric acid at 5% concentration and 90° C. for 180 seconds, the C content in the steel substrate of the steel sheet as a finished product was analyzed by the method prescribed in JIS G1211-3:2018. The results are listed in Table 3. In this experiment, each steel sheet after subjection to the final cold rolling was evaluated for crack-like defects using a defect inspection device of eddy current sensor type, based on the number of defects per 1000 m. The results are listed in Table 3.

As can be seen from the table, under the conditions according to the present disclosure, it is possible to obtain a grain-oriented electrical steel sheet that has few defects after subjection to final cold rolling, excellent iron loss properties, and a C content in steel not causing magnetic aging.

[Table 3]

TABLE 3

| No. | Type of acid | Fe ion concentration (%) | Iron loss $W_{17/50}$ (W/kg) | Number of defects after final cold rolling (counts) | C content in the steel sheet as a finished product (ppm) | Remarks |
|---|---|---|---|---|---|---|
| 42 | hydrochloric acid | 1 | 0.824 | 1.1 | 60 | Comparative example |
| 43 | hydrochloric acid | 2 | 0.832 | 1.0 | 20 | Example |
| 44 | hydrochloric acid | 4 | 0.840 | 0.6 | 15 | Example |
| 45 | hydrochloric acid | 8 | 0.837 | 0.2 | 15 | Example |
| 46 | hydrochloric acid | 14 | 0.835 | 0.3 | 17 | Example |
| 47 | hydrochloric acid | 17 | 0.838 | 1.0 | 90 | Comparative example |
| 48 | phosphoric acid | 1 | 0.851 | 1.2 | 60 | Comparative example |
| 49 | phosphoric acid | 4 | 0.826 | 0.1 | 21 | Example |
| 50 | phosphoric acid | 8 | 0.832 | 0.9 | 14 | Example |
| 51 | phosphoric acid | 17 | 0.839 | 0.9 | 70 | Comparative example |
| 52 | sulfuric acid | 1 | 0.821 | 0.5 | 60 | Comparative example |
| 53 | sulfuric acid | 4 | 0.824 | 0.5 | 12 | Example |
| 54 | sulfuric acid | 8 | 0.841 | 0.2 | 24 | Example |
| 55 | sulfuric acid | 17 | 0.842 | 1.6 | 60 | Comparative example |
| 56 | nitric acid | 1 | 0.826 | 0.4 | 80 | Comparative example |
| 57 | nitric acid | 4 | 0.843 | 1.7 | 20 | Example |
| 58 | nitric acid | 8 | 0.850 | 1.5 | 13 | Example |
| 59 | nitric acid | 17 | 0.850 | 1.5 | 70 | Example |

Underlined if outside the scope of disclosure

INDUSTRIAL APPLICABILITY

The method for producing a grain-oriented electrical steel sheet according to the present disclosure can provide a grain-oriented electrical steel sheet that is suitable for the iron core material of transformers, and is highly useful in industry.

The invention claimed is:

1. A method for producing a grain-oriented electrical steel sheet, comprising:

subjecting a steel material to hot rolling to obtain a hot-rolled steel sheet, the steel material having a chemical composition containing by mass %, C: 0.01% or more and 0.10% or less, Si: 2.0% or more and 5.0% or less, Mn: 0.01% or more and 0.50% or less, (i) one or both groups of: group α: Al: 0.01% or more and 0.04% or less and N: 0.003% or more and 0.010% or less, and group β: one or both of S and Se: 0.005% or more and 0.100% or less in total, or (ii) Al: 0.010% or less, N: 0.0060% or less, and one or both of S and Se: 0.010% or less in total, optionally at least one selected from the group consisting of Ni: more than 0% and 1.50% or less, Cr: more than 0% and 0.50% or less, Cu: more than 0% and 0.50% or less, P: more than 0% and 0.50% or less, Sb: more than 0% and 0.50% or less, Sn: more than 0% and 0.50% or less, Bi: more than 0% and 0.50% or less, Mo: more than 0% and 0.50% or less, B: more than 0 ppm and 25 ppm or less, Nb: more than 0% and 0.020% or less, V: more than 0% and 0.010% or less, Zr: more than 0% and 0.10% or less, Co: more than 0% and 0.050% or less, Pb: more than 0% and 0.0100% or less, As: more than 0% and 0.0200% or less, Zn: more than 0% and 0.020% or less, W: more than 0% and 0.0100% or less, Ge: more than 0% and 0.0050% or less, and Ga: more than 0% and 0.0050% or less, with the balance being Fe and inevitable impurities;

subjecting the hot-rolled steel sheet to cold rolling once, or twice or more with intermediate annealing in between, to obtain a cold-rolled steel sheet having a final sheet thickness;

then subjecting the cold-rolled steel sheet to decarburization annealing;

then applying an annealing separator to a surface of the steel sheet; and then subjecting the steel sheet to final annealing, wherein the following conditions are satisfied:

$$T \leq -4000 \times A + 440,$$

and $$T \leq 360,$$

wherein A denotes an average C content in mass % in a region ranging from 1/10 to 1/2 of a sheet thickness below the surface of the steel sheet after subjection to annealing preceding final cold rolling and before subjection to the final cold rolling, and T denotes a time in hours from just after the completion of the annealing preceding the final cold rolling to just before the start of the final cold rolling, and after the final cold rolling and before the decarburization annealing, pickling treatment is performed with a treatment solution having an acid with a concentration of 1 mass % or more and 20 mass % or less and an Fe ion content of 2 mass % or more and 15 mass % or less, wherein the acid is selected from the group consisting of phosphoric acid, hydrochloric acid, sulfuric acid, and nitric acid.

2. The method for producing a grain-oriented electrical steel sheet according to claim 1, wherein the decarburization annealing is divided into earlier-stage annealing and later-stage annealing, the earlier-stage annealing is performed in an annealing atmosphere with an atmospheric oxidizability $P(H_2O)/P(H_2)$ of 0.3 or more and 0.7 or less, and the later-stage annealing is performed in an annealing atmosphere with an atmospheric oxidizability $P(H_2O)/P(H_2)$ of 0.005 or more and 0.2 or less.

* * * * *